L. A. SCHNEIDER AND A. R. MEYER.
COW HALTER.
APPLICATION FILED SEPT. 17, 1920.
1,375,184.
Patented Apr. 19, 1921.
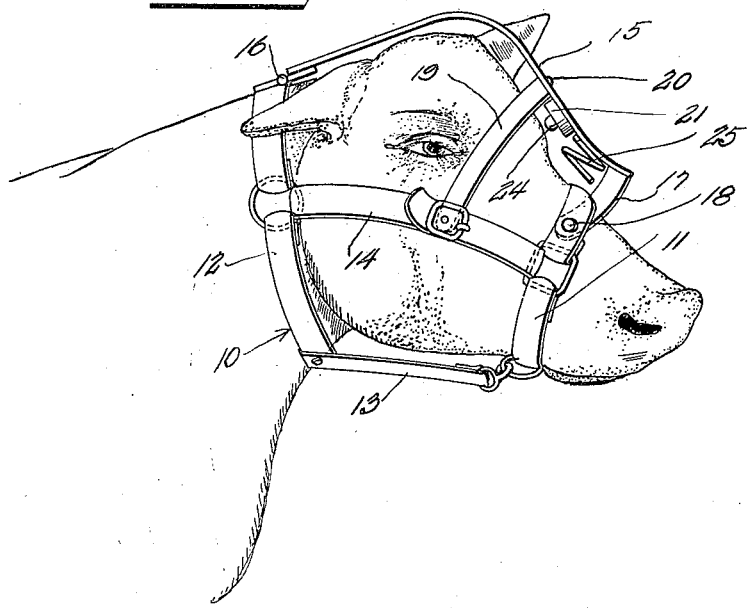
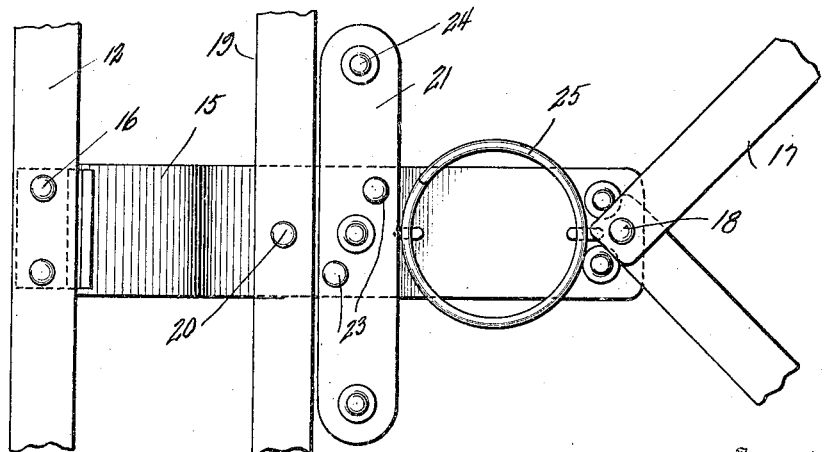
Inventor
Lawrence A. Schneider
and August R. Meyer
By J. Reaney Kelly
Attorney

UNITED STATES PATENT OFFICE.

LAWRENCE A. SCHNEIDER AND AUGUST R. MEYER, OF SPRINGFIELD, MINNESOTA.

COW-HALTER.

1,375,184.  Specification of Letters Patent.  Patented Apr. 19, 1921.

Application filed September 17, 1920. Serial No. 411,008.

*To all whom it may concern:*

Be it known that we, LAWRENCE A. SCHNEIDER and AUGUST R. MEYER, citizens of the United States, residing at Springfield, in the county of Brown and State of Minnesota, have invented certain new and useful Improvements in Cow-Halters, of which the following is a specification.

This invention relates to improvements in halters and more particularly to an attachment for a cow halter, of a "bumper" which when in place lies between the horns or horn stubs and projects downwardly on the face of the animal so as to prevent the animals from butting or bumping themselves.

The main object of our invention is to provide a device of the above character which can be quickly and easily attached to the halter and which when in place will greatly increase the efficiency thereof.

Various other objects and advantages of my invention will become apparent during the continuance of the following description.

In the drawings:

Figure 1 is a view in perspective showing our invention in place on a cow's head.

Fig. 2 is a view in bottom plan of our invention showing the supporting studs broken away.

In the drawings 10 designates the halter which is fitted about the head of an animal in the usual manner and as shown in Fig. 1, the same consisting of substantially front and rear loop straps 11 and 12 respectively and longitudinal or connecting straps 13 and 14.

The device of our invention consists of a body portion 15 preferably made of metal and bent at a point intermediate its ends into substantially the position shown in Fig. 1. The rear end of the member 15 is attached to the strap 12 as shown at 16 while the forward end of the member is carried upon a supplemental strap 17 which is in turn connected with the front strap 11 as shown at 18. An auxiliary supporting strap 19 depends from the longitudinal straps 13 and is connected at its end to the member 15 as shown at 20 in Fig. 2. This arrangement of supporting straps firmly holds the member 15 in position, the upper part of the member lying between the ears of the animal while the lower part lies on the face thereof between the eyes.

A cross bar 21 is positioned on the member 15 and secured in place as at 22 at a point slightly in advance in the point of bending of the member 15 and is provided at certain points throughout its length with projecting studs 23 and 24. The studs just referred to serve the purpose that will presently appear.

The member 15 also carries at a point adjacent its forward end a cushion member 25 which is designed to absorb the shock from the member 15 when the latter is bumped against a manger or other animal.

When the member 15 is in position, "bumping" thereof against the manger or another animal will cause it to engage the face of the animal, the studs 23 and 24 also engaging the face of the animal while the spring 25 tends to absorb the shock and prevent injury to the animal. The effect of such engagement of the member 15 on the face of the animal is to cause the latter to discontinue "bumping" of its head and neck thereby preventing injuries and efficiently serving the purpose for which it is designed.

From the foregoing it is believed that the advantages and novel features of our invention will be readily understood and therefore further detailed description is deemed unnecessary.

What is claimed is:

In a device of the character described, the combination with a cow halter including front and rear loop straps and longitudinal connecting straps, of a metallic body member, one end of said body member being connected to the top of said rear loop strap, the other end of said member being connected to the top of said front loop strap, means connected with said connecting strap and supporting said metallic member intermediate its ends, a transverse bar on said metallic member, depending studs on said bar, adapted to engage the face of the animal, and a cushion member carried on said metallic member to absorb the shock between said metallic member and the face of the animal in connection with which the halter is used substantially as described.

In testimony whereof we affix our signatures.

LAWRENCE A. SCHNEIDER.
AUG. R. MEYER.